(12) United States Patent
Hong et al.

(10) Patent No.: US 7,685,446 B2
(45) Date of Patent: Mar. 23, 2010

(54) DYNAMIC VOLTAGE SCALING METHOD OF CPU USING WORKLOAD ESTIMATOR AND COMPUTER READABLE MEDIUM STORING THE METHOD

(75) Inventors: Sung-Pack Hong, Suwon-si (KR); Sung-Joo Yoo, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 657 days.

(21) Appl. No.: 11/559,117

(22) Filed: Nov. 13, 2006

(65) Prior Publication Data
US 2007/0245317 A1  Oct. 18, 2007

(30) Foreign Application Priority Data
Feb. 3, 2006  (KR)  ...................... 10-2006-0010883

(51) Int. Cl.
G06F 1/26 (2006.01)
G06F 1/00 (2006.01)
G06F 11/30 (2006.01)
G06F 9/44 (2006.01)
G06F 9/45 (2006.01)
G01M 19/00 (2006.01)

(52) U.S. Cl. .................. 713/320; 713/300; 702/123; 702/186; 717/135; 717/154

(58) Field of Classification Search ................. 713/300, 713/320; 702/123, 186; 717/135, 154
See application file for complete search history.

(56) References Cited

U.S. PATENT DOCUMENTS

| 7,222,030 B2 * | 5/2007 | Banginwar et al. ............ 702/60 |
| 7,225,435 B2 * | 5/2007 | Flores et al. ................. 717/135 |
| 2003/0226047 A1* | 12/2003 | Park et al. .................... 713/300 |
| 2005/0215227 A1 | 9/2005 | Vu et al. |
| 2006/0080079 A1* | 4/2006 | Yamabana ..................... 704/2 |

FOREIGN PATENT DOCUMENTS

| JP | 9218731 | 8/1997 |
| JP | 2004-118355 | 4/2004 |
| KR | 1019990042210 | 6/1999 |

OTHER PUBLICATIONS

English Abstract for Publication No. 1019990042210.

* cited by examiner

*Primary Examiner*—Chun Cao
*Assistant Examiner*—Stefan Stoynov
(74) *Attorney, Agent, or Firm*—F. Chau & Associates, LLC

(57) ABSTRACT

A method for scaling a dynamic voltage of a CPU is achieved by setting a voltage setting point for each of a plurality of code segments of a program, and profiling workload by measuring a workload variation of each of the code segments based on data that changes whenever measured, selecting a plurality of combinations, each having a plurality of voltage setting points, and calculating workload estimators corresponding to the voltage setting points of each of the selected combinations based on the workload variation measured in the workload profiling operation, selecting an optimal combination that consumes a least energy of the CPU based on the workload estimators, and determining whether a real time constraint is satisfied when an operating voltage is set based on the workload estimator corresponding to each of the voltage setting points of the optimal combination during runtime, and setting the operating voltage based on a result of the determination.

24 Claims, 3 Drawing Sheets

DYNAMIC VOLTAGE SCALING METHOD OF CPU USING WORKLOAD ESTIMATOR AND COMPUTER READABLE MEDIUM STORING THE METHOD

CROSS-REFERENCE TO RELATED PATENT APPLICATION

This application claims priority under 35 U.S.C. §119 from Korean Patent Application No. 10-2006-0010883, filed on Feb. 3, 2006, the disclosure of which is hereby incorporated by reference herein as if set forth in its entirety.

BACKGROUND OF THE INVENTION

1. Technical Field

The present disclosure relates to a dynamic voltage scaling of a CPU, and more particularly, to a method of scaling the dynamic voltage of a CPU by which a workload is profiled in units of code segments having the same size and low power consumption and a real time constraint or deadline is guaranteed using a workload estimator calculated by the average workload, and a computer readable medium storing the method.

2. Discussion of the Related Art

A dynamic voltage scaling (DVS) function of a CPU is one of various hardware characteristics that is devised to reduce an electric power consumed by the CPU. To properly utilize the DVS function, a method to appropriately convert a voltage at a proper instant through software is essential. Executing the job by an application program itself is referred to as an intra-task DVS algorithm.

In a real time system that requires an instant response to an external reaction, a response to a particular request must be processed within a set time, that is, a deadline or real time constraint. Accordingly, the lowering of an operating voltage too much to reduce the power consumption of a CPU may cause a delay of a response to the particular request over the deadline so that the real time system can be severely damaged. Thus, a method to correct the above problem is needed.

The conventional intra-task DVS algorithm is one that uses a worst case execution time or relies on a basic block code segment. The worst case execution time algorithm is to estimate a workload variation of each of the code segments of a program based on the data that changes whenever estimated and sets an operating voltage based on the maximum workload value of the estimated workload values.

The workload signifies the number of clock (CLK) cycles of a CPU needed to execute a code segment of a program. When the workload variation of the code segment is mostly distributed at a level quite lower than the maximum workload value, since the operating voltage is set to be higher than an actually needed operating voltage, the worst case execution time algorithm has a problem that the consumption of power by the CPU increases.

The basic block code segment algorithm is used to scale an operating voltage using a basic block as a single code segment unit and assumes that the workload of the basic block is always the same. In an actual case, however, due to a hardware characteristic such as a cache or memory delay, the workload of the basic block is changed, and is not maintained constant. As a result, the basic block code segment algorithm also has the problem of unnecessary power consumption because the operating voltage is set based on the maximum workload value as in the worst case execution time algorithm.

To change the operating voltage in the DVS of a CPU, a predetermined overhead is needed. The basic block code segment algorithm uses a basic block typically consisting of four or five instructions as a unit of the DVS. The size of the workload of the basic block is much smaller than the overhead. Thus, since the workload between the basic blocks is too small to apply an operating voltage changed by the DVS between the basic blocks, the changed operating voltage cannot be applied between the basic blocks.

Also according to the basic block code segment algorithm, the DVS is performed with respect to all basic blocks in a loop whenever each of a plurality of circulation loops are repeatedly performed. Thus, hundreds of thousands of scaling points are generated with respect to an application program having a practical size, which are difficult to extract.

SUMMARY OF THE INVENTION

Exemplary embodiments of the present invention provide a method in which a code segment having a predetermined size that is parameterized to overcome overhead is used as a unit of dynamic voltage scaling point and a workload estimator between scaling points is used to enable a low power CPU operation and guarantee a deadline, and a computer readable medium storing a program to execute the method.

According to an exemplary embodiment of the present invention, a method for scaling a dynamic voltage of a CPU comprises setting a voltage setting point, profiling, selecting a combination, calculating a workload estimator, selecting an optimal combination, and guaranteeing a real time constraint.

In the setting of a voltage setting point, a voltage setting point corresponding to each of a plurality of code segments of a program is set. The code segments may be a function call or a circulation loop. In the profiling, a workload variation of each of the code segments is measured based on data that changes whenever measured.

In the selecting of a plurality of combinations, a combination having a plurality of voltage setting points selected from the set voltage setting points is selected. In the calculating of workload estimators, workload estimators corresponding to the voltage setting points of each of the combinations are calculated based on the measured workload variation.

In the selecting of an optimal combination, operating voltages corresponding to the workload estimators are calculated by reapplying the profiled workload, the energy consumption amount of the CPU is calculated based on the operating voltages, and the operations of selecting of a combination, calculating of workload estimators, and calculating of operating voltages and an energy consumption amount of the CPU are repeatedly performed, and an optimal combination that consumes the least energy of the CPU according to the result thereof is selected.

In the guaranteeing of a real time constraint, whether a real time constraint is satisfied when an operating voltage is set based on the workload estimator corresponding to each of the voltage setting points of the optimal combination during runtime, is determined, and the operating voltage based on a result of the determination is set.

BRIEF DESCRIPTION OF THE DRAWINGS

Exemplary embodiments of the present invention will be understood in more detail from the following descriptions taken in conjunction with the accompanying drawings in which.

DETAILED DESCRIPTION OF THE EXEMPLARY EMBODIMENTS

Figure 1:
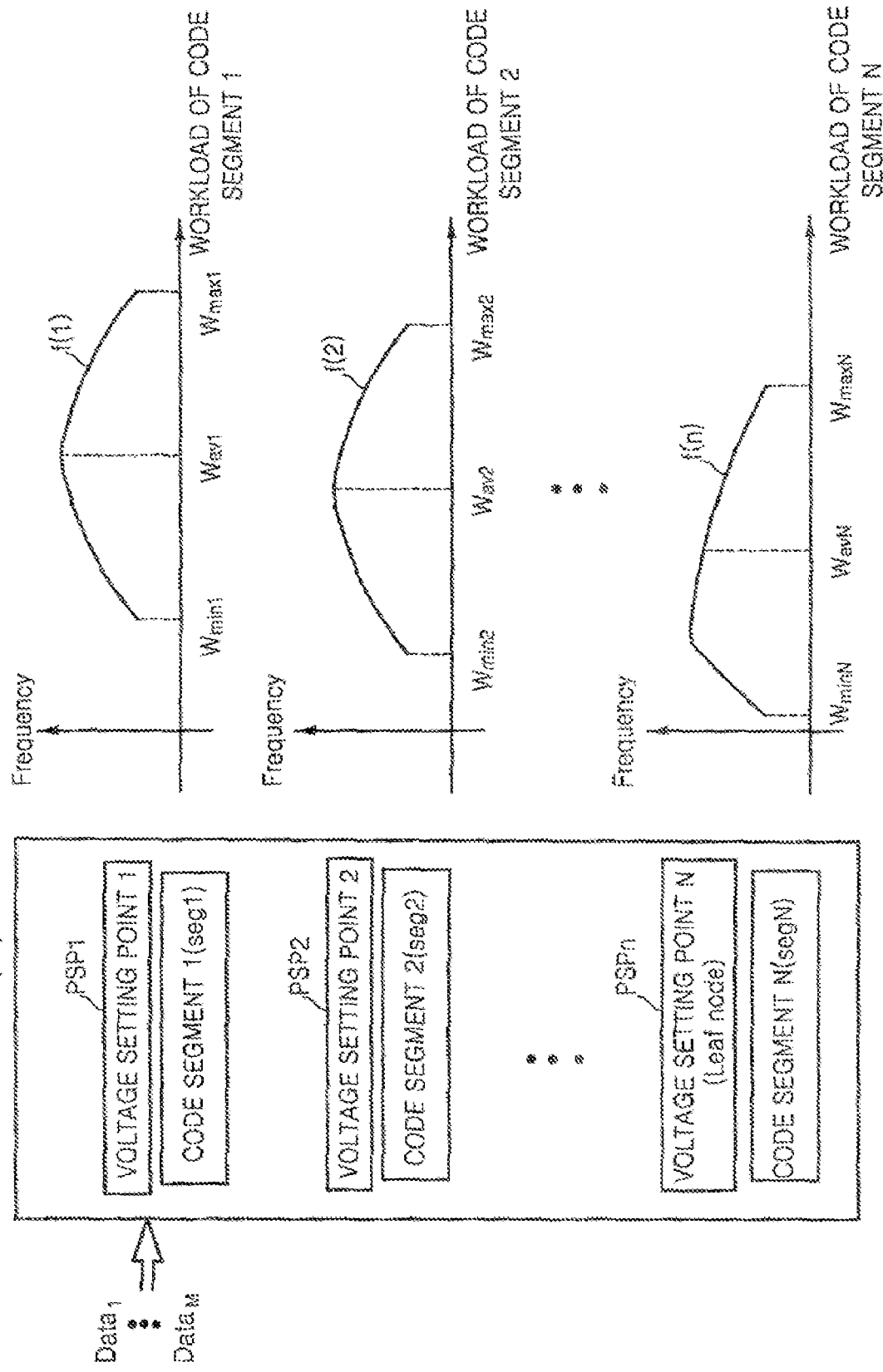
FIG. 1 is a conceptual view of voltage setting point setting and workload profiling according an exemplary embodiment of the present invention.

FIG. 1 is a conceptual view of voltage setting point setting and workload profiling according to an exemplary embodiment of the present invention. Referring to FIG. 1, a predetermined program #1) is divided into a plurality of code segments seg1 through segN. Voltage setting points PSP1 through PSPn are set to correspond to the respective code segments seg1 through segN. The program is executed based on data value $Data_1$ and a workload value for each of the code segments seg1 through segN is measured.

Histograms f(1) through f(n) showing the distribution of workload values to the respective code segments seg1 through segN are obtained by executing the program while changing the data value from $Data_2$ to $Data_M$ and measuring the workload value to each of the code segments seg1 through segN corresponding to each of the changed data values from $Data_2$ to $Data_M$. Average workload values Wav1 through WavN, the minimum workload values Wmin1 through WminN, and the maximum workload values Wmax1 through WmaxN are obtained from the histograms f(1) through f(n).

Figure 2:
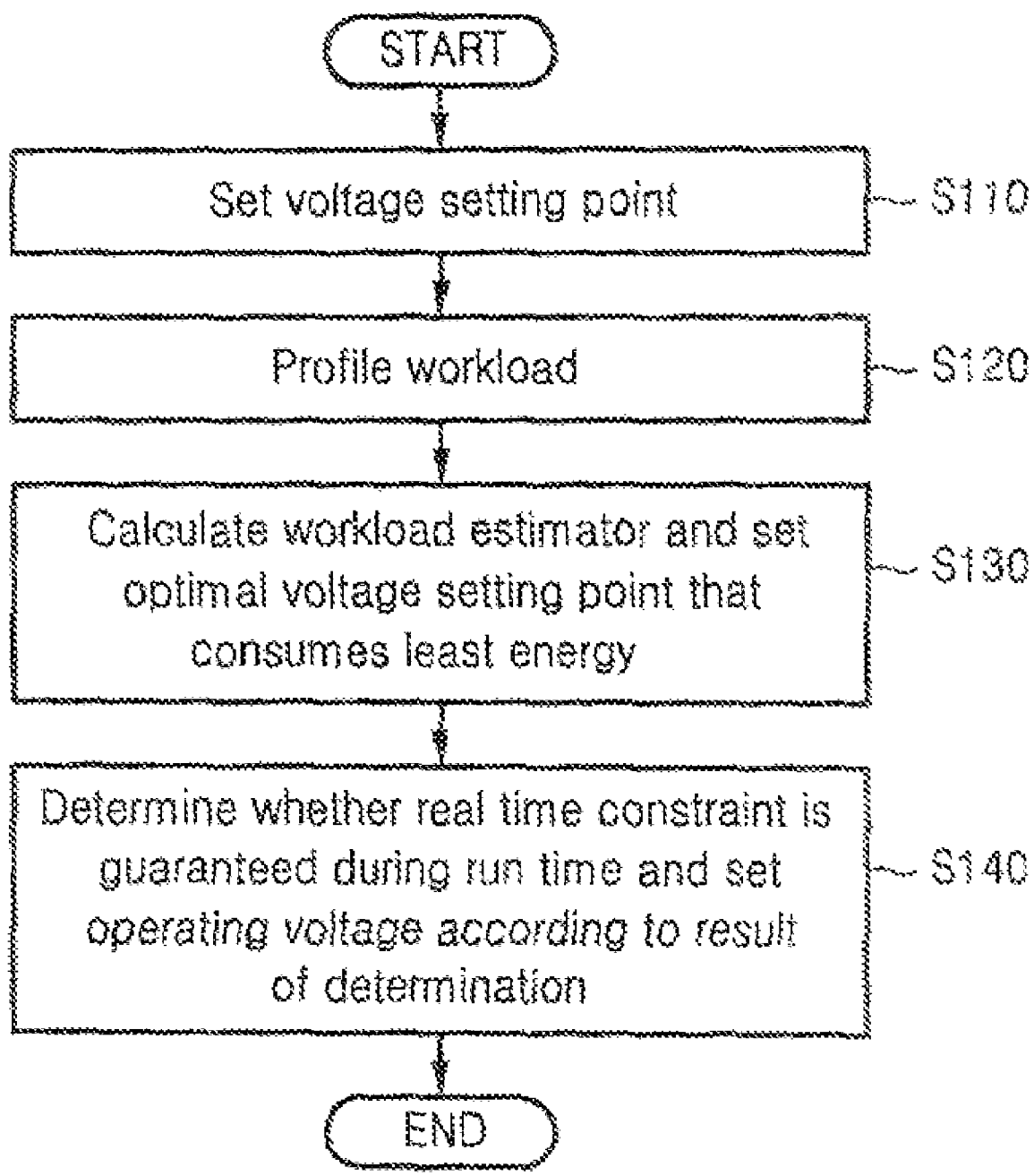
FIG. 2 is a flowchart for explaining a method for scaling an operating voltage of a CPU according to an exemplary embodiment of the present invention.

FIG. 2 is a flowchart for explaining a method for scaling an operating voltage of a CPU according to an exemplary embodiment of the present invention. Referring to FIG. 2, a voltage setting point is set to each of the code segments of a program in a compile operation (S110). A workload variation of each of the code segments is measured based on the data that changes whenever measured (S120).

A plurality of combinations having a plurality of voltage setting points are selected from the set voltage setting points. Workload estimators corresponding to the voltage setting points of each of the selected combinations are calculated based on the measured workload variation. An optimal combination that consumes the least energy of a CPU is selected when the workload estimators are calculated and the profiled workload is reapplied (S130).

When an operating voltage corresponding to each of the optimal voltage setting points is calculated in the above-described compile operation voltage needs to be adjusted to guarantee a real time constraint or a deadline during run time. Thus, when the operating voltage is set based on the workload estimator corresponding to each of the voltage setting points of the optimal combination during the run time, whether the real time constraint is satisfied is determined and the operating voltage corresponding thereto is set based on the result of the determination (S140).

Whether each of the voltage setting points of the optimal combination is a leaf node is determined and the operating voltage is set based on the result of the determination. The leaf node signifies the last voltage setting point at which the operating voltage can be set.

Figure 3:
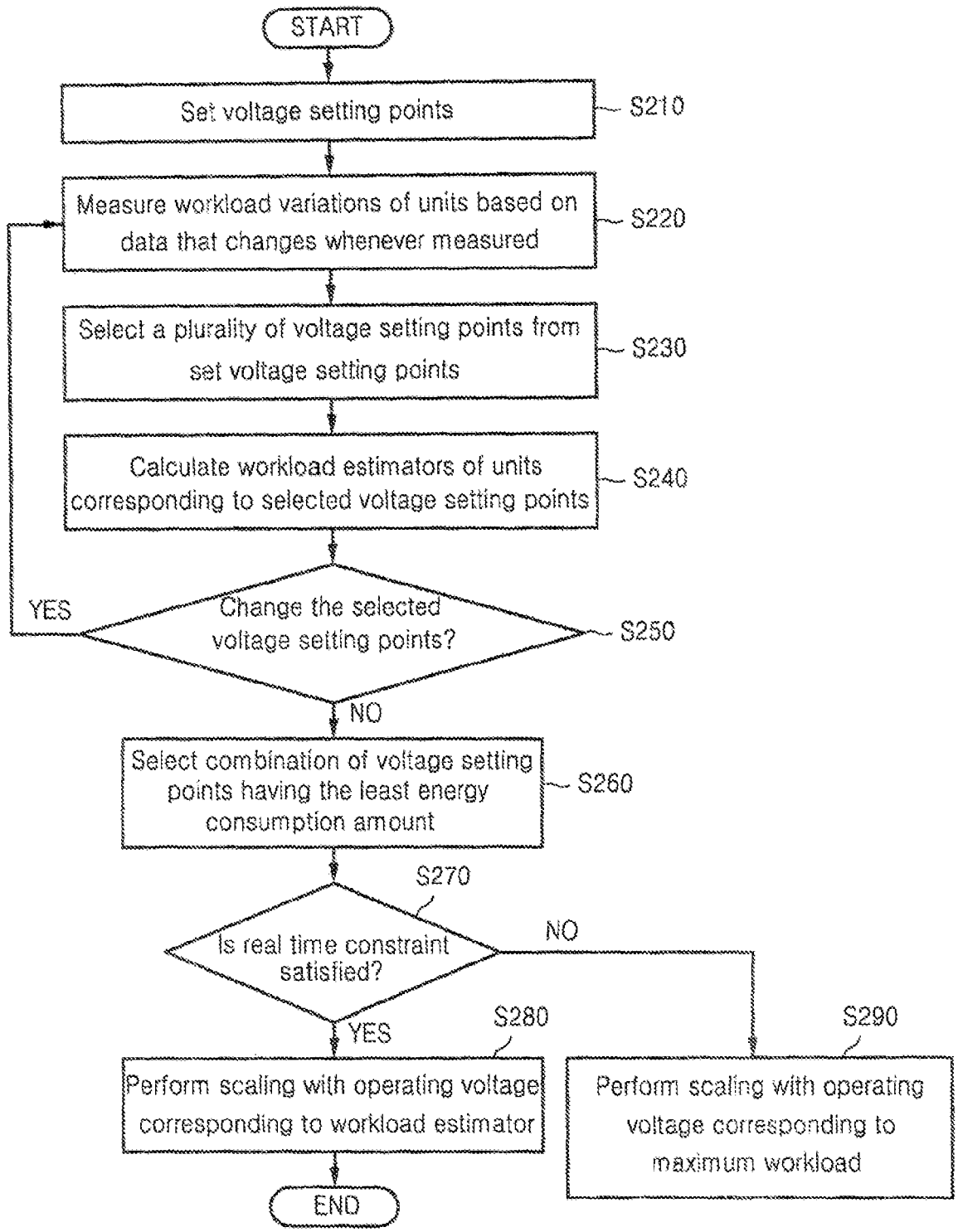
FIG. 3 is a flowchart for explaining a method for scaling an operating voltage of a CPU according to an exemplary embodiment of the present invention.

FIG. 3 is a flowchart for explaining a method for scaling an operating voltage of a CPU according to an exemplary embodiment of the present invention. Referring to FIGS. 1 and 3, the voltage setting points PSP1 through PSPn are set to the respective code segments seg1 through segN of a program #1 (S210). Each of the code segments seg1 through segN can be a function call or a circulation loop. A code segment parameterized to have a size big enough to overcome overhead of dynamic voltage scaling (DVS), not a basic block, can be set as a unit of the DVS.

The voltage setting point is inserted in each of an entry point PSP1 and an exit point PSPn of task and in each of an entry point and an exit point of a circulation loop, but not in a body of the circulation loop. The voltage setting point is inserted before function calls start and after the function calls end, that is returned.

For a function called only once, when other function calls exist in the function, the voltage setting point can be inserted for each of the existing function calls. It is possible to manually insert the voltage setting point at the particular position that a developer desires.

The workload variation of the respective code segments seg1 through segN is measured based on the data $Data_1$ through $Data_M$ that change whenever measured (S220). The workload for each of the code segments seg1 through segN is measured by executing simulation or profile run. The workload variation can be obtained for the respective code segments seg1 through segN based on the result of measurement. The distribution of the workload variation can be expressed by the histograms f(1) through f(n), which is referred to as workload profiling.

An average workload Wavk is calculated from the workload variation of a code segment segk existing between the $k^{th}$ and $(k+1)^{th}$ voltage setting points PSPk and PSPk+1, where k is a natural number, which are selected from the set voltage setting points PSP1 through PSPn. When the average workload Wavk is less that a value obtained by multiplying a dynamic voltage scaling overhead needed to change the operating voltage by a predetermined constant, the $(k+1)^{th}$ voltage setting point PSPk+1 is deleted and the $(k+1)^{th}$ voltage setting point PSPk+1 is merged into the $k^{th}$ voltage setting point PSPk.

Also, when the code segment is a circulation loop and the average workload of the circulation loop is over a predetermined value, the operating voltage of the circulation loop is changed whenever the circulation loop is repeated Z times, where Z is a natural number greater than or equal to 1 ($Z \geq 1$). A combination having a plurality of voltage setting points, for example, PSP1, PSP3, PSP5, . . . , among the set voltage setting points PSP1 through PSPn is selected (S230).

Workload estimators, for example, $\delta(1)$, $\delta(3)$, $\delta(5)$, . . . , corresponding to the voltage setting points of the selected combination, for example, PSP1, PSP3, PSP5, . . . , are calculated, based on the measured workload variation f(1) through f(n) (S240). The workload estimators, for example, $\delta(1)$, $\delta(3)$, $\delta(5)$, . . . , are given as values for one of the following heuristics.

According to a first heuristic, the workload estimators, for example, $\delta(1)$, $\delta(3)$, $\delta(5)$, . . . , are generated based on Equation 1 when the voltage setting point is the leaf node, and based on Equation 2 when the voltage setting point is not the leaf node.

$$\delta(k) = \sqrt[3]{A(k) \times W(k)^2} \quad \text{[Equation 1]}$$

$$\delta(k) = A(k) \times \alpha + \sqrt[3]{\sum (P(i) \times \delta(i)^3)}, \quad (i = 0, 1, 2, \ldots) \quad \text{[Equation 2]}$$

In the above equations, δ(k) is workload estimator of the k$^{th}$ voltage setting point. A(k) is an average workload from the k$^{th}$ voltage setting point PSPk to the (k+1)$^{th}$ voltage setting point PSPk+1. α is a value given as a parameter, for example, 1 to 1.1 increasing by 0.01 and one of the values that minimizes the energy consumption amount is selected. W(k) is the maximum workload from the k$^{th}$ voltage setting point PSPk to the (k+1)$^{th}$ voltage setting point PSPk+1. δ(i) is a workload estimator of each of the voltage setting points branched from the k$^{th}$ voltage setting point PSPk. P(i) is a probability corresponding to each of the branched voltage setting points.

According to a second heuristic, the workload estimators, for example, δ(1), δ(3), δ(5), . . . , are generated based on Equation 1 when the voltage setting point is the leaf node, and based on Equation 3 when the voltage setting point is not the leaf node.

$$\delta(k) = A(k)\chi_\alpha + \sqrt[3]{\sum (P(i) \times \delta(i)^3)},$$ [Equation 3]

$$\alpha = 1 + \max\left(0.1, \frac{\sigma(k)}{2\chi_\mu}\right), (i = 0, 1, 2 \ldots)$$

In Equation 3, μ is the same value as A(k), and σ(k) is a standard deviation of workload from the k$^{th}$ voltage setting point PSPk to the (k+1)$^{th}$ voltage setting point PSPk+1.

The workload variation profiled to each of the voltage setting points, for example, PSP1, PSP3, PSP5, . . . , is obtained by reapplying the profiled workload. Operating frequencies, fr1, fr3, fr5, . . . , corresponding to the respective voltage setting points, for example, PSP1, PSP3, PSP5, . . . , can be obtained by reapplying the workload estimators, for example, δ(1), δ(3), δ(5), . . . , and the profiled workload variation. For example, the operating frequency fr(k) at the k$^{th}$ voltage setting point is a value obtained by dividing the workload estimator δ(k) corresponding to the operating frequency fr(k) by the time T left until the completion of task at the k$^{th}$ voltage setting point (fr(k)=δ(k)/T).

Thus, since the operating voltage, for example, V(k), at the k$^{th}$ voltage setting point PSPk is in proportion to the operating frequency f(k), when the workload estimator δ(k) is calculated, the operating voltage V(k) is obtained. Also, the energy consumption amount consumed at the code segment segk can be calculated based on the operating voltage V(k).

Thus, the energy consumption amount of the code segments, for example, seg1, seg3, seg5, . . . , corresponding to the respective voltage setting points, for example, PSP1, PSP3, PSP5, . . . , of the selected combination is obtained. The sum of the energy consumption amounts is the energy consumption amount of a CPU corresponding to the combination selected in the operation S230.

The operations S230 through S240 are repeatedly performed. An optimal combination having the least energy consumption amount is selected from the energy consumption amounts of a CPU according to the result of the repeated performance of the operations (S250 through S260). The operating voltage corresponding to each of the voltage setting points of the optimal combination is calculated in the compile operations S210 through S260.

When the operating voltage of each of the voltage setting points of the optimal combination is used during run time (S270 through S290), the real time constraint must be guaranteed. To guarantee the real time constraint, when the voltage setting point is the leaf node, the operating voltage is unconditionally set to correspond to the maximum workload. Since the leaf node is the last node capable of setting the operating voltage, the operating voltage, or the operating frequency, which can guarantee the real time constraint is set on the assumption of the maximum workload.

When the voltage setting point is not the leaf node, it is determined whether Equation 4 is satisfied, and the operating voltage is set based on the result of the determination.

$$T \geq \left(\frac{WT(k+1)}{f(\max)}\right) \times \left(\frac{\delta(k)}{\delta(k) - W(k)}\right)$$ [Equation 4]

In Equation 4, T is the time left until the completion of the program #1. f(max) is the default maximum frequency. WT(k+1) is a maximum workload until the completion of the program #1 at the (k+1)$^{th}$ voltage setting point PSPk+1. (W(k) is the maximum workload from the k$^{th}$ voltage setting point PSPk to the (k+1)$^{th}$ voltage setting point PSPk+1. δ(k) is a workload estimator corresponding to the k$^{th}$ voltage setting point PSPk.

When Equation 4 is satisfied, the operating voltage V(k) corresponding to the workload estimator δ(k) is used as it is (S280). When Equation 4 is not satisfied, the operating voltage corresponding to the maximum workload W(k) is set (S290).

As described above, in the dynamic voltage scaling method according to exemplary embodiments of the present invention and a computer readable medium storing a program to execute the method, a code segment having a predetermined size parameterized to overcome overhead is used as the unit of the dynamic voltage scaling point, and the workload estimator between the scaling points is used. Thus, while real time constraint is guaranteed, the operation of a lower energy CPU is made possible.

The invention can also be exemplarily embodied as computer readable codes on a computer readable recording medium. The computer readable recording medium includes computer readable storage medium (e.g. read-only memory (ROM), random-access memory (RAM), CD-ROMs, magnetic tapes, floppy disks, optical data storage devices), and transmission medium (e.g., carrier waves) for data transmission through the Internet. The computer readable recording medium can also be distributed over network coupled computer systems so that the computer readable code is stored and executed in a distributed fashion. Also, functional programs, codes, and code segments for accomplishing the exemplary embodiments of the present invention can be easily construed by programmers skilled in the art to which the present invention pertains.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method for scaling a dynamic voltage of a CPU comprising:

setting a voltage setting point for each of a plurality of code segments of a program, and profiling a workload by measuring a workload variation of each of the code segments based on data that changes whenever measured;

selecting a plurality of combinations, each having a plurality of voltage setting points, and calculating workload estimators corresponding to the voltage setting points of each of the combinations selected based on the workload variation measured in the workload profiling operation; and selecting an optimal combination that consumes a least energy of the CPU based on the calculated workload estimators.

2. The method of claim 1, further comprising determining whether a real time constraint is satisfied when an operating voltage is set based on the workload estimator corresponding to each of the voltage setting points of the optimal combination during a runtime, and setting the operating voltage corresponding to each of the voltage setting points based on a result of the determination.

3. A method for scaling a dynamic voltage of a CPU comprising:

setting a voltage setting point for each of a plurality of code segments of a program;

profiling workload by measuring a workload variation of each of the code segments based on data that changes whenever measured;

selecting a combination having at least one voltage setting point that is selected from the set voltage setting points;

calculating workload estimators corresponding to the voltage setting points of the selected combination based on the measured workload variation;

calculating operating voltages corresponding to the workload estimators and an amount of consumption of energy of the CPU based on the operating voltages; and repeating the operations of selecting a combination, calculating of workload estimators, and calculating of operating voltages and an energy consumption amount of the CPU, and selecting an optimal combination that consumes a least energy of the CPU based on a result of the repeating.

4. The method of claim 3, further comprising determining whether a real time constraint is satisfied when an operating voltage is set based on the workload estimator corresponding to each of the voltage setting points of the optimal combination during a runtime, and setting the operating voltage corresponding to each of the voltage setting points based on a result of the determination.

5. The method of claim 4, wherein the code segment is one of a function call and a circulation loop.

6. The method of claim 4, wherein, in the setting of a voltage setting point, the voltage setting point is set at one of an entry point and exit point of the program, at an entry point and an exit point of a circulation loop, and at an entry point and an exit point of a function call.

7. The method of claim 4, wherein, in the setting of a voltage setting point, an average workload from the workload variation of a code segment existing between $k^{th}$ and $(k+1)^{th}$ voltage setting points, where k is a natural number, which are selected from the set voltage setting points, is less than a value obtained by multiplying a voltage scaling overhead needed to change the operating voltage by a predetermined constant, the $(k+1)^{th}$ voltage setting point is deleted and the $(k+1)^{th}$ voltage setting point is merged into the $k^{th}$ voltage setting point.

8. The method of claim 4, wherein, in the selecting of a combination, the code segment is circulation loop and, when an average workload of the circulation loop is over a predetermined value, the operating voltage changes whenever the circulation loop is repeated Z times, where Z is a natural number greater than or equal to 1.

9. The method of claim 4, wherein the workload estimators are generated based on an equation. $\delta(k)=\sqrt[3]{A(k) \times W(k)^2}$, when the voltage setting point is a leaf node, and based on another equation, $\delta(k)=A(k) \times \alpha \div \sqrt[3]{\Sigma(P(i) \times \delta(i)^3}$, (i=0, 1, 2 . . . ), when the voltage setting point is not the leaf node, where $\delta(k)$ is workload estimator of a $k^{th}$ voltage setting point, A(k) is an average workload from the $k^{th}$ voltage setting point to a $(k+1)^{th}$ voltage setting point, .alpha. is a value selected from predetermined values given as a parameter that minimizes the energy consumption amount, W(k) is the maximum workload from the $k^{th}$ voltage setting point to the $(k+1)^{th}$ voltage setting point, $\delta(i)$ is a workload estimator of each of the voltage setting points branched from the $k^{th}$ voltage setting point, and P(i) is a probability corresponding to each of the branched voltage setting points.

10. The method of claim 4, wherein the workload estimators are generated based on an equation, $\delta(k)=\sqrt[3]{A(k) \times W(k)^2}$, when the voltage setting point is a leaf node, and based on another equation, $$\delta(k) = A(k)\chi_\alpha + \sqrt[3]{\sum(P(i) \times \delta(i)^3)},$$
$$\alpha = 1 + \max\left(0.1, \frac{\sigma(k)}{2\chi_\mu}\right), (i = 0, 1, 2 \ldots)$$

when the voltage setting point is not the leaf node, where $\delta(k)$ is a workload estimator of a $k^{th}$ voltage setting point, A(k) is an average workload from the $k^{th}$ voltage setting point to a $(k+1)^{th}$ voltage setting point, $\alpha$ is a value selected from predetermined values given as a parameter that minimizes the energy consumption amount, W(k) is the maximum workload from the $k^{th}$ voltage setting point to the $(k+1)^{th}$ voltage setting point, $\delta(i)$ is a workload estimator of each of the voltage setting points branched from the $k^{th}$ voltage setting point, P(i) is a probability corresponding to each of the branched voltage setting points, $\mu$ is the same value as A(k), and $\sigma(k)$ is a standard deviation of workload from the $k^{th}$ voltage setting point to the $(k+1)^{th}$ voltage setting point.

11. The method of claim 4, wherein the setting of an operating voltage further comprises determining whether each of the voltage setting points of the optimal combination is a leaf node, and setting the operating voltage based on a result of the determination.

12. The method of claim 11, wherein, in the setting of an operating voltage, the CPU is operated with an operating voltage corresponding to a maximum workload when the voltage setting point is a leaf node, and an operating voltage corresponding to the maximum workload is set when the voltage setting point is not the leaf node and an equation, $$T \geq \left(\frac{WT(k+1)}{f(\max)}\right) \times \left(\frac{\delta(k)}{\delta(k) - W(k)}\right),$$

is not satisfied, where T is the time left until the completion of the program, f(max) is a default maximum frequency, WT(k+1) is a maximum workload until the completion of the program at a $(k+1)^{th}$ voltage setting point, W(k) is a maximum workload from a $k^{th}$ voltage setting point to the $(k+1)^{th}$ voltage setting point, and $\delta(k)$ is a workload estimator corresponding to the $k^{th}$ voltage setting point.

13. A computer readable storage medium storing a program to execute method steps for scaling a dynamic voltage of a CPU, the method steps comprising:

setting a voltage setting point for each of a plurality of code segments of a program, and profiling a workload by measuring a workload variation of each of the code segments based on data that changes whenever measured;

selecting a plurality of combinations, each having a plurality of voltage setting points, and calculation workload estimators corresponding to the voltage setting points of each of the combinations selected based on the workload variation measured in the workload profiling operation; and selecting an optimal combination that consumes a least energy of the CPU based on the calculated workload estimators.

14. The computer readable storage medium of claim 13, further comprising determining whether a real time constraint is satisfied when an operating voltage is set based on the workload estimator corresponding to each of the voltage setting points of the optimal combination during a runtime, and setting the operating voltage corresponding to each of the voltage setting points based on a result of the determination.

15. A computer readable storage medium storing a program to execute method steps for scaling a dynamic voltage of a CPU, the method steps comprising:

setting a voltage setting point for each of a plurality of code segments of a program;

profiling workload by measuring a workload variation of each of the code segments based on data that changes whenever measured;

selecting a combination having at least one voltage setting point that is selected from the set voltage setting points;

calculating workload estimators corresponding to the voltage setting points of the selected combination based on the measured workload variation;

calculating operating voltages corresponding to the workload estimators and an amount of consumption of energy of the CPU based on the operating voltages; and repeating the operations of selecting a combination, calculating of workload estimators, and calculating of operating voltages and an energy consumption amount of the CPU, and selecting an optimal combination that consumes a least energy of the CPU based on a result of the repeating.

16. The computer readable storage medium of claim 15, further comprising determining whether a real time constraint is satisfied when an operating voltage is set based on the workload estimator corresponding to each of the voltage setting points of the optimal combination during a runtime, and setting the operating voltage corresponding to each of the voltage setting points based on a result of the determination.

17. The computer readable storage medium of claim 16, wherein the code segment is one of a function call and a circulation loop.

18. The computer readable storage medium of claim 16, wherein, in the setting of a voltage setting point, the voltage setting point is set at one of an entry point and an exit point of the program, at an entry point and an exit point of a circulation loop, and at an entry point and an exit point of a function call.

19. The computer readable storage medium of claim 16, wherein, in the setting of a voltage setting point, an average workload from the workload variation of a code segment existing between $k^{th}$ and $(k+1)^{th}$ voltage setting points, where k is a natural number, which are selected from the set voltage setting points, is less than a value obtained by multiplying a voltage scaling overhead needed to change the operating voltage by a predetermined constant, the $(k+1)^{th}$ voltage setting point is deleted and the $(k+1)^{th}$ voltage setting point is merged into the $k^{th}$ voltage setting point.

20. The computer readable storage medium of claim 16, wherein, in the selecting of a combination, the code segment is a circulation loop and, when an average workload of the circulation loop is over a predetermined value, the operating voltage changes whenever the circulation loop is repeated Z times, where Z is a natural number greater than or equal to 1.

21. The computer readable storage medium of claim 16, wherein the workload estimators are generated based on an equation, $\delta(k)=\sqrt[3]{A(k) \times W(k)^2}$, when the voltage setting point is a leaf node, and based on another equation, $\delta(k)=A(k) \times \alpha + \sqrt[3]{(P(i) \times \delta(i)^3)}$, (i=0, 1, 2, ... ), when the voltage setting point is not the leaf node, where $\delta(k)$ is a workload estimator of a $k^{th}$ voltage setting point, $A(k)$ is an average workload from the $k^{th}$ voltage setting point to a $(k+1)^{th}$ voltage setting point, $\alpha$ is a value selected from predetermined values given as a parameter that minimizes the energy consumption amount, $W(k)$ is the maximum workload from the $k^{th}$ voltage setting point to the $(k+1)^{th}$ voltage setting point, $\delta(i)$ is a workload estimator of each of the voltage setting points branched from the $k^{th}$ voltage setting point, and $P(i)$ is a probability corresponding to each of the branched voltage setting points.

22. The computer readable storage medium of claim 16, wherein the workload estimators are generated based on an equation, $\delta(k)=\sqrt[3]{A(k) \times W(k)^2}$, when the voltage setting point is a leaf node, and based on another equation, $$\delta(k) = A(k)\chi_\alpha + \sqrt[3]{\sum (P(i) \times \delta(i)^3)},$$

$$\alpha = 1 + \max\left(0.1, \frac{\sigma(k)}{2\chi_\mu}\right), (i = 0, 1, 2 ...)$$

when the voltage setting point is not the leaf node, where $\delta(k)$ is a workload estimator of a $k^{th}$ voltage setting point, $A(k)$ is an average workload from the $k^{th}$ voltage setting point to a $(k+1)^{th}$ voltage setting point, $\alpha$ is a value selected from predetermined values given as a parameter that minimizes the energy consumption amount, $W(k)$ is the maximum workload from the $k^{th}$ voltage setting point to the $(k+1)^{th}$ voltage setting point, $\delta(i)$ is a workload estimator of each of the voltage setting points branched from the $k^{th}$ voltage setting point, $P(i)$ is a probability corresponding to each of the branched voltage setting points, $\mu$ is the same value as $A(k)$, and $\sigma(k)$ is a standard deviation of workload from the $k^{th}$ voltage setting point to the $(k+1)^{th}$ voltage setting point.

23. The computer readable storage medium of claim 16, wherein the setting of an operating voltage further comprises determining whether each of the voltage setting points of the optimal combination is a leaf node, and setting the operating voltage based on a result of the determination.

24. The computer readable storage medium of claim 23, wherein, in the setting of an operating voltage, the CPU is operated with an operating voltage corresponding to a maximum workload when the voltage setting point is a leaf node, and an operating voltage corresponding to the maximum workload is set when the voltage setting point is not the leaf node and an equation, $$T \geq \left(\frac{WT(k+1)}{f(\max)}\right) \times \left(\frac{\delta(k)}{\delta(k) - W(k)}\right),$$

is not satisfied, where T is the time left until the completion of the program, f(max) is a default maximum frequency, WT(k+1) is a maximum workload until the completion of the program at a $(k+1)^{th}$ voltage setting point, W(k) is a maximum workload from a $k^{th}$ voltage setting point to the $(k+1)^{th}$ voltage setting point, and δ(k) is a workload estimator corresponding to the $k^{th}$ voltage setting point.

* * * * *